(12) United States Patent
Hanson

(10) Patent No.: US 6,218,812 B1
(45) Date of Patent: Apr. 17, 2001

(54) SOLID STATE BATTERY CHARGER

(76) Inventor: Mark E. Hanson, 184 Vista La., Fincastle, VA (US) 24090

( * ) Notice: Subject to any disclaimer, the term of this patent is extended or adjusted under 35 U.S.C. 154(b) by 0 days.

(21) Appl. No.: 09/570,897

(22) Filed: May 15, 2000

Related U.S. Application Data

(60) Provisional application No. 60/134,463, filed on May 17, 1999.

(51) Int. Cl.[7] .......................... H01M 10/44; H01M 10/46
(52) U.S. Cl. .............................................. 320/161
(58) Field of Search .................... 320/124, 125, 320/137, 156, 161

(56) References Cited

U.S. PATENT DOCUMENTS 5,670,863 * 9/1997 Broell et al. .
5,710,506 * 1/1998 Broell et al. .
5,744,933 * 4/1998 Inoue et al. .
6,008,624 * 12/1999 Bergstrom et al. .

* cited by examiner

Primary Examiner—Edward H. Tso
(74) Attorney, Agent, or Firm—Carl B. Horton, Esq.; Damian Wasserbauer, Esq.; Armstrong Teasdale LLP

(57) ABSTRACT

A method for charging batteries using a solid state battery charger is disclosed which includes the steps of supplying a constant current to the batteries being charged until the battery voltage reaches a first threshold voltage value, supplying a constant voltage to the batteries being charged until current being drawn by the batteries reaches a threshold current value and supplying a constant current to the batteries being charged until a voltage rise per unit time threshold is met.

29 Claims, 1 Drawing Sheet

SOLID STATE BATTERY CHARGER

CROSS REFERENCE TO RELATED APPLICATIONS

This application claims the benefit of U.S. Provisional Application No. 60/134,463, filed May 17, 1999, which is hereby incorporated by reference in its entirety.

BACKGROUND OF THE INVENTION

This invention relates generally to charging batteries, and more specifically to methods and systems for charging batteries and extending battery life.

Known methods of charging rechargeable batteries, such as lead-acid batteries found in automobiles and other electric vehicles, typically are constant voltage source chargers. Since the proper voltage for such a battery depends on a variety of factors including battery age, temperature, and the amount of charge in the battery, known constant voltage chargers tend to overcharge older or lower voltage or hotter batteries and tend to undercharge newer, cooler higher voltage batteries. In addition batteries tend to discharge over time due to an internal current draw or self discharge leakage between the cells of the battery. Depending on storage temperatures, known batteries discharge to a 50% charge anywhere from three to nine months.

It would be desirable to develop a battery charger and method of battery charging which can take into account the battery factors listed above and develop a more efficient charge for a battery to be charged. In addition it would be desirable to develop a method and system for retaining full charges on under utilized batteries, for example, batteries in an electric vehicle in storage for a winter.

BRIEF SUMMARY OF THE INVENTION

In an exemplary embodiment, a solid state battery charger algorithm implements an algorithm for charging batteries comprising the steps of supplying a constant current to the batteries being charged until the battery voltage reaches a first threshold voltage value, supplying a constant voltage to the batteries being charged until current being drawn by the batteries reaches a threshold current value, and supplying a constant current to the batteries being charged until a voltage rise per unit time threshold is met. The above described method overcomes overcharging and undercharging problems known to exist in known constant voltage supply battery chargers.

In addition the battery charging algorithm constantly monitors battery performance and can reinitiate a charging cycle when monitored battery parameters so dictate.

DETAILED DESCRIPTION OF THE INVENTION

Figure 1:
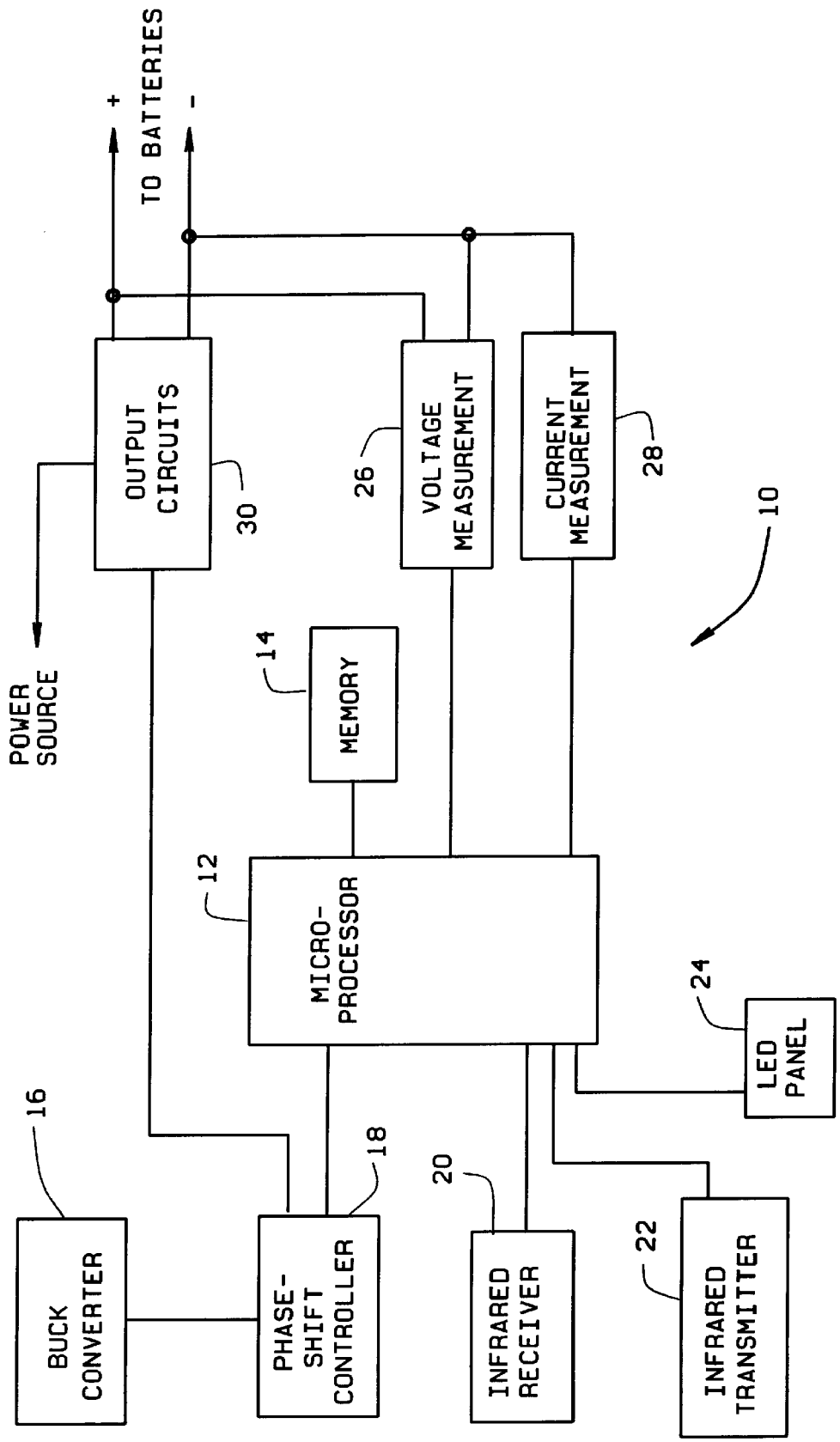
FIG. 1 is a block diagram of a solid state battery charger according to one embodiment of the present invention.

FIG. 1 is a block diagram 10 of a solid state battery charger according to one embodiment of the present invention. Included in block diagram 10 are a microprocessor 12 and memory 14 which contain a battery charging algorithm to be executed by microprocessor 12. As used herein, microprocessor 12 refers to controllers and processors, including microcontrollers, programmable logic controllers, input/output controllers, reduced instruction set circuits, application specific integrated circuits, logic circuits, and any other circuit, processor or microcomputer capable of processing the embodiments described herein. Memory 14 can be either internal or external to microprocessor 12.

A buck converter 16 and phase shift controller 18 form a switching power supply from which the electronics in the charger are powered. Switching power supply include filtering circuitry for removing the switching frequency in a differential mode. Electromagnetic interference is reduced through use of ceramic FET insulators to lower common mode emissions at harmonic frequencies. Phase shift controller 18 uses a phase modulator so that outputs are always square wave regardless of a pulse width modulated controller used in buck converter 16. As phase is shifted, DC output is zero. A current transformer is included in controller 18 so that control circuitry may be run off the battery being charged. A current signal at the switching frequency introduces noise at the switching frequency and a filter is within controller to filter out the switching noise.

A receiver 20 and transmitter 22 are included as options to the charger to provide external communication with an outside device, for example, a computer, such as a laptop or other handheld unit. Receiver 20 and transmitter 22 communication can be any of several known formats including a hard wired interface, such as an RS-232 serial interface, or alternatively can be infrared (optical), for example using the television remote standard of a 40 kilohertz carrier or other standard. Alternatively a radio frequency interface can be used. Information to be communicated across receiver 20 and transmitter 22 interface could include, but is not limited to battery charging voltage, battery charging current, battery charger temperature, total ampere-hours used, a number of times a battery voltage has dropped below a particular voltage threshold, initial battery charge state, error diagnostic messages, battery charge time, and other user specified messages.

A light emitting diode (LED) panel 24 is an option to the charger which includes a plurality of indications as to the state of the battery charger and of the battery itself. Although described in terms of an LED indicator, panel 24 can be in a number of formats, including incandescent indicators, meters, etc. Indicators monitor charger and battery operation as part of an algorithm stored in memory 14. A partial list of functions monitored include an indication of a charger over temperature condition, battery disconnect, a percentage of battery charge threshold, for example 80%, a charge cycle complete indication, an active charge cycle indication, and an indication of low battery charge, for example 20%.

A voltage measurement circuit 26 and a current measurement circuit 28 monitor the state of the battery during charge cycles and use. Output circuits 30 generate the voltage and currents necessary for charging of the battery or batteries.

One exemplary algorithm for the charging of batteries includes a three stage charging cycle including a constant current cycle followed by a constant voltage cycle followed by a constant current cycle described in more details as follows: a constant current is applied to the battery being charged until the battery voltage reaches a specified voltage threshold stored as part of the charging algorithm stored in memory 14. At that point the battery charger becomes a constant voltage source charger until the current being absorbed by the battery decreases to a current threshold value, also stored as part of the charging algorithm. Then a constant current charge, at a different current level then the first current charging cycle, is applied to the battery or batteries until the change in voltage of the battery over a predetermined time approaches a predetermined threshold (dv/dt), at which time the charger shuts off. In one embodiment, the constant current charge of the third stage runs until the change in battery voltage (dv/dt) is less than 0.1 volt per cell per hour, at which time the charger shuts off. The above described charging algorithm compensates for older batteries or the temperatures at which charging is taking place.

In another embodiment, the charger is configured with a maximum time charge cycle, for safety purposes. One example is a twelve hour maximum charge cycle.

The battery charger is configured to monitor battery voltage when the battery is not in a charge cycle. When the charger detects that battery voltage has dropped below a preprogrammed threshold, the charging cycle will automatically be restarted. Automatic recharging extends battery life as batteries should not be stored in a partially discharged state. Other embodiments of the battery charger include inhibition of use during a charge cycle, maintaining a running total of ampere-hours used, and a running total of a number of times a battery voltage has dipped below a preprogrammed voltage. Inhibition of use during charging cycles is accomplished by feeding the signal signifying that an active charging cycle is taking place back into the microprocessor.

Using a battery charger as described above adds life, sometimes up to a year, to known lead-acid batteries. The life is extended due to the final part of the charging algorithm which supplies a constant current to the battery until the change in battery voltage over time is reduced to a predetermined value, as described above. Battery life is extended because the complete charging cycle of the algorithm causes an equalizing charge each cycle. Plates located in the battery cells are scrubbed and complete material replacement for the deposits on the plates is achieved. The algorithm thus compensates for older or hot batteries that typically charge to lower voltages and newer or cold batteries that typically charge to higher voltages using other known battery chargers. Therefore known battery chargers tend to overcharge older batteries and undercharge newer batteries.

While the invention has been described in terms of various specific embodiments, those skilled in the art will recognize that the invention can be practiced with modification within the spirit and scope of the claims.

What is claimed is:

1. A method for charging batteries using a solid state battery charger, said method comprising the steps of:
    supplying a constant current to the batteries being charged until the battery voltage reaches a first threshold voltage value; and
    supplying a constant voltage to the batteries being charged until current being drawn by the batteries reaches a threshold current value.

2. A method according to claim 1 further comprising the step of supplying a constant current to the batteries being charged until a voltage rise per unit time threshold (dv/dt) is met.

3. A method according to claim 1 further comprising the step of continuously monitoring battery voltage.

4. A method according to claim 3 wherein when the battery voltage decreases to a second threshold voltage value said method further comprises the steps of:
    supplying a constant current to the batteries being charged until the battery voltage reaches a first threshold voltage value;
    supplying a constant voltage to the batteries being charged until current being drawn by the batteries reaches a threshold current value; and
    supplying a constant current to the batteries being charged until a voltage rise per unit time threshold (dv/dt) is met.

5. A method according to claim 1 further comprising the step of inhibiting use of a device powered by the batteries during a charge cycle.

6. A method according to claim 1 further comprising the step of storing a running total of ampere-hours supplied by the battery charger.

7. A method according to claim 1 further comprising the step of storing a running total of a number of times each battery has dropped below a predetermined voltage value.

8. A method according to claim 1 further comprising the step of limiting a charge cycle to a predetermined time.

9. A method according to claim 1 further comprising the step of supplying a signal that indicates the charger is in a charge cycle.

10. A method according to claim 1 further comprising the step of supplying a signal that indicates a charge cycle is complete.

11. A method according to claim 1 further comprising the step of supplying a signal that indicates an 80% battery charge level during a charge cycle.

12. A method according to claim 1 further comprising the step of supplying a signal that indicates an over temperature condition in the battery charger.

13. A solid state battery charger comprising:
    an output circuit for supplying current and voltage to a battery to be charged;
    voltage and current measurement circuits for monitoring battery parameters;
    a microprocessor; and
    a memory, said memory to be either internal or external to said microprocessor, said microprocessor configured to apply a constant current charge to the batteries being charged until the battery voltage reaches a first threshold voltage value and supply a constant voltage to the batteries being charged until current being drawn by the batteries reaches a threshold current value.

14. A battery charger according to claim 13 wherein said microprocessor further configured to supply a constant current charge to the batteries being charged until a voltage rise per unit time threshold (dv/dt) is met.

15. A battery charger according to claim 14 wherein said voltage rise per unit time threshold (dv/dt) is less than 0.1 volts per cell per hour.

16. A battery charger according to claim 13 wherein said microprocessor further configured to continuously monitor battery voltage.

17. A battery charger according to claim 16 wherein when the battery voltage decreases to a second threshold voltage value said microprocessor further configured to:
    supply a constant current to the batteries being charged until the battery voltage reaches a first threshold voltage value;
    supply a constant voltage to the batteries being charged until current being drawn by the batteries reaches a threshold current value; and
    supply a constant current to the batteries being charged until a voltage rise per unit time threshold (dv/dt) is met.

18. A battery charger according to claim 13 wherein said microprocessor further configured to inhibit use of a device powered by the batteries during a charge cycle.

19. A battery charger according to claim 13 wherein said microprocessor further configured to store a running total of ampere-hours supplied by the battery charger.

20. A battery charger according to claim 13 wherein said microprocessor further configured to store a running total of a number of times a battery or batteries has dropped below a predetermined voltage value.

21. A battery charger according to claim 13 wherein said microprocessor further configured to limit a battery charge cycle to a predetermined time.

22. A battery charger according to claim 13 wherein said microprocessor further configured to supply a signal that indicates the charger is in a charge cycle.

23. A battery charger according to claim 13 wherein said microprocessor further configured to supply a signal that indicates a charge cycle is complete.

24. A battery charger according to claim 13 wherein said microprocessor further configured to supply a signal that indicates an 80% battery charge level during a charge cycle.

25. A battery charger according to claim 13 wherein said microprocessor further configured to supply a signal that indicates an over temperature condition in the battery charger.

26. A battery charger according to claim 13 further comprising an interface for communicating battery and battery charger parameters to an external computer.

27. A battery charger according to claim 26 wherein said interface is infrared.

28. A battery charger according to claim 26 wherein said interface is a serial data interface.

29. A battery charger according to claim 22 wherein said battery charging algorithm further configured to communicate, battery charging voltage, battery charging current, battery charger temperature, total ampere-hours used, a number of times a battery voltage has dropped below a particular voltage threshold, initial battery charge state, error diagnostic messages, battery charge time, and user specified messages over said interface.

* * * * *